(12) United States Patent
Ji et al.

(10) Patent No.: US 11,267,925 B2
(45) Date of Patent: Mar. 8, 2022

(54) WATER-BASED POLYURETHANE DISPERSIONS AND THEIR PREPARATION

(71) Applicant: Dow Global Technologies LLC, Midland, MI (US)

(72) Inventors: Jing Ji, Shanghai (CN); Felipe A. Donate, Midland, MI (US); Xin Jiang, Shanghai (CN); Cheng Shen, Shanghai (CN); Kazuyuki Hasegawa, Yokohama (JP); Jacob Crosthwaite, Midland, MI (US); Rebecca J. Wachowicz, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 16/626,736

(22) PCT Filed: Jun. 30, 2017

(86) PCT No.: PCT/CN2017/090991
§ 371 (c)(1),
(2) Date: Dec. 26, 2019

(87) PCT Pub. No.: WO2019/000359
PCT Pub. Date: Jan. 3, 2019

(65) Prior Publication Data
US 2020/0115487 A1    Apr. 16, 2020

(51) Int. Cl.
*C08G 18/08* (2006.01)
*C08G 18/12* (2006.01)
(Continued)

(52) U.S. Cl.
CPC ......... *C08G 18/0852* (2013.01); *C08G 18/12* (2013.01); *C08G 18/244* (2013.01);
(Continued)

(58) Field of Classification Search
CPC ........................... C08G 18/0852; C08G 18/12
See application file for complete search history.

(56) References Cited

U.S. PATENT DOCUMENTS

| 4,012,445 A | 3/1977 | Priest et al. |
| 4,150,046 A | 4/1979 | Hunger et al. |

(Continued)

FOREIGN PATENT DOCUMENTS

| CA | 1047531 A | 1/1979 |
| CA | 1095489 A | 2/1981 |

(Continued)

OTHER PUBLICATIONS

Computer-generated English-language translation of CN102702476A (Year: 2013).*

(Continued)

*Primary Examiner* — Vu A Nguyen
(74) *Attorney, Agent, or Firm* — Quarles & Brady LLP

(57) ABSTRACT

A prepolymer comprising acid functionality is made by a process comprising the step of contacting: (i) a di-isocyanate, (ii) a polyol containing an acid group, (iii) a polyol without an acid group, and (iv) a metal salt catalyst, the contacting conducted under reaction conditions and in a solvent consisting essentially of: (A) a dialkyl amide, and (B) optionally, an aprotic glycol ether. The prepolymer is useful in the preparation of water-based polyurethane dispersions, and certain of the solvent blends consisting essentially of a dialkyl amide and an optional aprotic glycol ether are azeotropic or pseudo-azeotropic.

9 Claims, 4 Drawing Sheets

(51) Int. Cl.
*C09D 7/20* (2018.01)
*C08G 18/24* (2006.01)
*C08G 18/34* (2006.01)
*C09D 175/04* (2006.01)

(52) U.S. Cl.
CPC ............. *C08G 18/348* (2013.01); *C09D 7/20* (2018.01); *C09D 175/04* (2013.01)

(56) References Cited

U.S. PATENT DOCUMENTS

| | | | |
|---|---|---|---|
| 4,385,133 A | | 5/1983 | Alberino et al. |
| 4,522,975 A | | 6/1985 | O'Connor et al. |
| 5,167,899 A | | 12/1992 | Jezic |
| 2012/0259061 A1 | * | 10/2012 | Felice ................ C08G 18/3228 524/591 |
| 2018/0162983 A1 | | 6/2018 | Matsuoka et al. |

FOREIGN PATENT DOCUMENTS

| | | | | |
|---|---|---|---|---|
| CN | 101175787 A | | 5/2008 | |
| CN | 102702476 A | | 10/2012 | |
| CN | 105601881 A | * | 5/2016 | |
| CN | 105601881 A | | 5/2016 | |
| JP | 5108388 B2 | | 12/2012 | |
| JP | 2014224214 A | | 12/2014 | |
| WO | 2015194672 A1 | | 12/2015 | |
| WO | 2016/163394 A1 | | 10/2016 | |
| WO | WO-2016190080 A1 | * | 12/2016 | ............. C08G 18/12 |

OTHER PUBLICATIONS

Computer-generated English-language translation of CN-105601881-A.*

* cited by examiner

WATER-BASED POLYURETHANE DISPERSIONS AND THEIR PREPARATION

FIELD OF THE INVENTION

This invention relates to water-based polyurethane dispersions (PUD).

BACKGROUND OF THE INVENTION

Water-based polyurethane dispersions (PUD) are well known, environment friendly resins for different coatings, inks and adhesives applications. There are two different approaches in commercial production of polyurethane dispersions, the acetone process and the prepolymer process. As acetone is a flammable solvent, the prepolymer process is the widely used one. In this process, PUDs are made from a di-isocyanate and a polyol. In this two-step process, a polymer is firstly made by reacting the di-isocyanate and the polyol in the presence of a tin catalyst. A polyol containing an acid group, e.g., 2,2-dimethylolpropionic acid (DMPA), is used to react with the di-isocyanate and incorporate acid functionality into the polyurethane (PU) prepolymer. In the second step, the acid and the residual di-isocyanate are neutralized with an amine, and the neutralized PU polymer is dispersed in water to obtain the PUD. In step one, a solvent like N-methyl-2-pyrrolidone (NMP) has been used for many years to dissolve DMPA during the prepolymer synthesis due to its good affinity for DMPA.

NMP is a particularly important, versatile solvent and the preferred reaction medium for the PUD chemical industry because of its low volatility, thermal stability, high polarity, aprotic, noncorrosive and good solubility properties. However, it has been demonstrated that NMP shows reproductive toxicity in animal testing. As a result, NMP has recently been classified as a potential reprotoxic substance under the Registration, Evaluation, Authorization and Restriction of Chemical Substances (REACH), which drives the increasing safety and regulatory concerns at global level.

Therefore, a solvent with a better environmental, health and safety (EHS) profile and similar solubility properties is expected to replace NMP. Dipropylene glycol dimethyl ether (DPGDME) and N-ethylpyrrolidone (NEP) are two commercially available solvents which manufacturers use to replace NMP. NEP is less harmful than NMP but still toxic. DPGDME has no risk to health but has limited solubility for DMPA so the PU polymer preparation usually proceeds at a slower rate than with NMP. Additionally, the final solvent concentration in the PUD is about 5 to 8% by weight. So, the water solubility of the solvent is important in producing a stable dispersion. NMP is completely water-soluble but DPGDME is only partly water soluble. PUD producers have also replaced NMP with ketones, e.g., methyl isobutyl ketone, or esters, but these solvents need to be removed from the prepolymer before dispersing in water since they are not water-soluble. The ideal solvent in PUD synthesis should be compatible with water-based PUDs with good affinity for the polyol containing an acid group, e.g., DMPA.

SUMMARY

In one embodiment the invention is a process for making a prepolymer comprising acid group, the process comprising the step of contacting
(i) a di-isocyanate,
(ii) a polyol containing an acid group,
(iii) a polyol without an acid group, and
(iv) a metal salt catalyst,
the contacting conducted under reaction conditions and in a solvent consisting essentially of:
(A) a first component consisting of at least one dialkyl amide, and
(B) optionally, a second component consisting of at least one an aprotic glycol ether.

In one embodiment the acid group of the polyol containing an acid group is a carboxylic acid group. In one embodiment the polyol containing an acid group is DMPA. In one embodiment the metal salt catalyst is an organic tin salt. In one embodiment the optional aprotic glycol ether is present.

In one embodiment the invention is a three-step process for making a water-based polyurethane dispersion (PUD), the process comprising the steps of:
(1) forming a prepolymer with acid group by contacting:
(i) a di-isocyanate,
(ii) a polyol containing an acid group,
(iii) a polyol without an acid group, and
(iv) a metal salt catalyst,
the contacting conducted under reaction conditions and in a solvent consisting essentially of:
(A) a first component consisting of at least one dialkyl amide, and
(B) optionally, a second component consisting of at least one an aprotic glycol ether;
(2) neutralizing the acid group of the prepolymer and any residual di-isocyanate with a base; and
(3) dispersing the neutralized prepolymer in water.

In one embodiment the acid group of the polyol containing an acid group is a carboxylic acid group. In one embodiment the polyol containing an acid group is DMPA. In one embodiment the metal salt catalyst is an organic tin salt. In one embodiment the optional aprotic glycol ether is present. In one embodiment the base is an amine.

In one embodiment the invention is a polyurethane dispersion comprising (i) a prepolymer comprising an neutralized acid group, (ii) a dialkyl amide, and (iii) water. In one embodiment the dispersion further comprises an aprotic glycol ether. In one embodiment the neutralized acid group is an amine-neutralized carboxyl group.

DETAILED DESCRIPTION

Definitions

Figure 1:
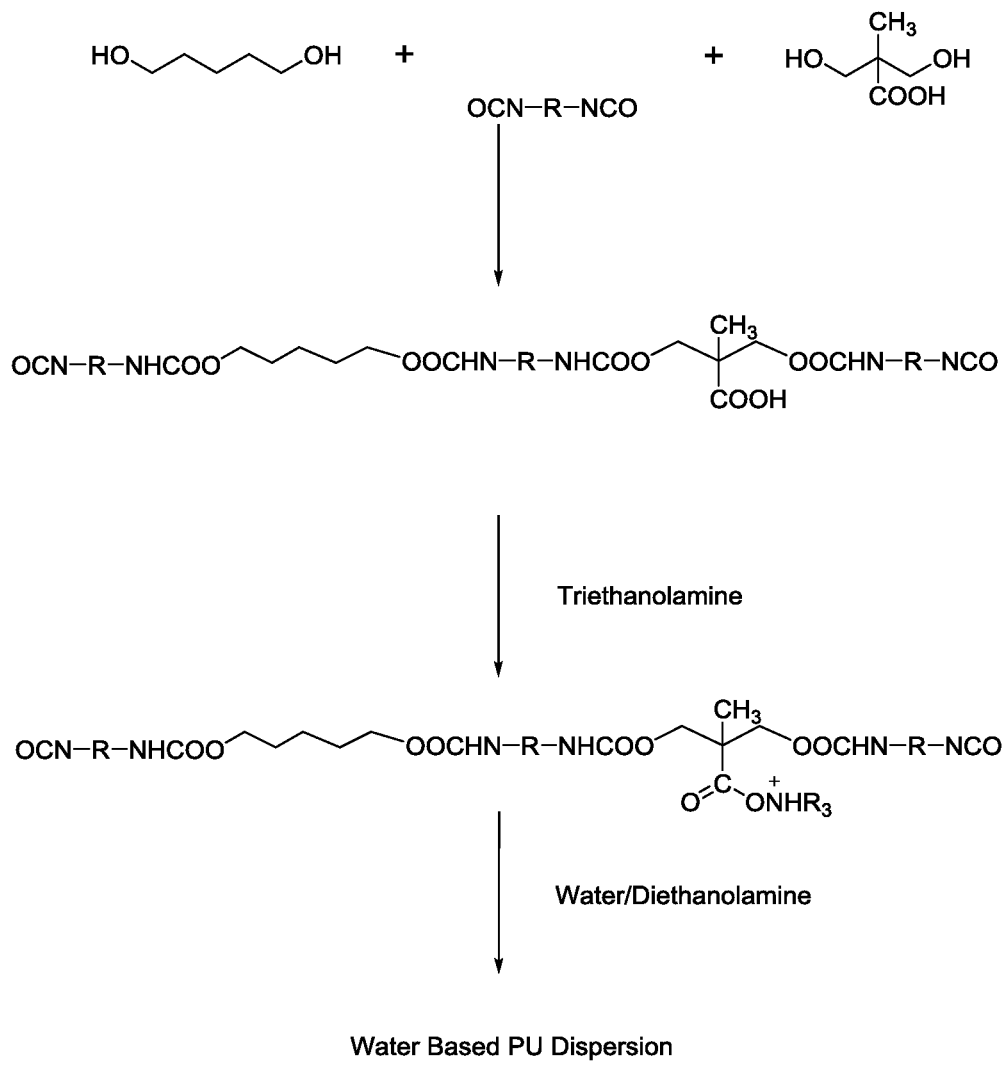
FIG. 1 illustrates a simple reaction mechanism for a water-based PUD. A PU polymer is made by reacting a di-isocyanate and a polyol in the presence of a tin catalyst. 2,2-Dimethylolpropionic acid (DMPA) is a polyol (specifically, a diol), and it is used to incorporate carboxylic acid functionality into the PU prepolymer. In the second step, the carboxylic acid functionality and the residual di-isocyanate are neutralized with an amine, and the neutralized PU polymer is dispersed in water to obtain the PUD. In step one, a polar solvent is used to dissolve DMPA during the prepolymer synthesis. In commercial practice, NMP is the most widely used solvent for this purpose. In this invention, the polar solvent is a system comprising a dialkyl amide and, optionally, an aprotic glycol ether.

For purposes of United States patent practice, the contents of any referenced patent, patent application or publication are incorporated by reference in their entirety (or its equivalent U.S. version is so incorporated by reference), especially with respect to the disclosure of definitions (to the extent not inconsistent with any definitions specifically provided in this disclosure) and general knowledge in the art.

Unless stated to the contrary, implicit from the context, or customary in the art, all parts and percents are based on weight and all test methods are current as of the filing date of this disclosure.

The numerical ranges disclosed herein include all values from, and including, the lower and upper value. For ranged containing explicit values (e.g., 1 or 2; or 3 to 5; or 6; or 7), any subrange between any two explicit values is included (e.g., 1 to 2; 2 to 6; 5 to 7; 3 to 7; 5 to 6; etc.).

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

"Prepolymer" and like terms mean a compound made from the reaction of a di-isocyanate and a polyol. Prepolymers are formed by combining an excess of diisocyanate with polyol. As shown in the illustration below, one of the isocyanate groups (NCO) of the di-isocyanate reacts with one of the hydroxy groups (OH) of the polyol; the other end of the polyol reacts with another di-isocyanate. The resulting prepolymer has an isocyanate group on both ends. The prepolymer is a di-isocyanate itself, and it reacts like a di-isocyanate but with several important differences. When compared with the original di-isocyanate, the prepolymer has a greater molecular weight, a higher viscosity, a lower isocyanate content by weight (% NCO), and a lower vapor pressure.

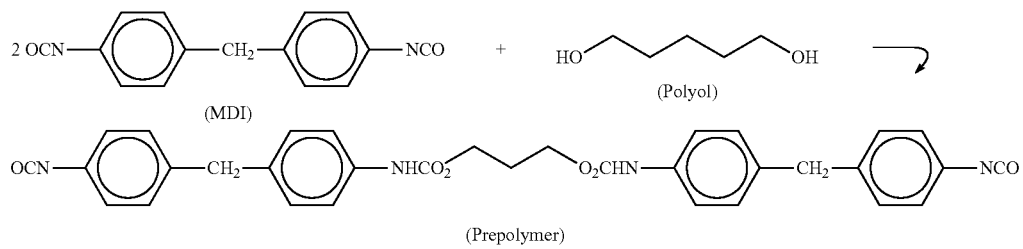

The prepolymer used in the practice of this invention includes one or more units derived from a polyol containing an acid group, e.g., DMPA, to introduce carboxylic acid functionality into the prepolymer.

"Acid group", "acid functionality" and like terms mean a substituent on a monomer, oligomer or polymer that donates protons, or hydrogen ions, in an aqueous solution.

"Reaction conditions" and like terms generally refer to temperature, pressure, reactant concentrations, catalyst concentration, cocatalyst concentration, monomer conversion, product and by-product (or solids) content of the reaction mixture (or mass) and/or other conditions that influence the properties of the resulting product. The reaction conditions for forming a prepolymer from a di-isocyanate and a polyol are well known in the art, and they typically include a temperature of 40° C. to 150° C., atmospheric pressure, a nitrogen atmosphere and the absence of water.

"Solvent" and like terms mean a substance that is capable of dissolving another substance (i.e., a solute) to form an essentially uniformly dispersed mixture (i.e., solution) at the molecular or ionic size level.

"Aprotic" and like terms describe a solvent, e.g., a glycol ether, that is not capable of donating a proton. Protic solvents are a solvents that have a hydrogen atom bound to an oxygen (as in a hydroxyl group) or a nitrogen (as in an amine group). In general terms, any solvent that contains labile H+ is a protic solvent. Representative protic solvents include DOWANOL™ DPM (dipropylene glycol methyl ether), DOWANOL™ TPM (tripropylene glycol methyl ether), DOWANOL™ DPnP (dipropylene glycol n-propyl ether), DOWANOL™ DPnB (dipropylene glycol n-butyl ether), and DOWANOL™ TPnB (tripropylene glycol n-propyl ether). The molecules of such solvents readily donate protons (H+) to reagents. The glycol ethers used in the practice of this invention, e.g., PROGLYDE™ DMM (dipropylene glycol dimethyl ether), do not contain labile H+. The commercially available aprotic solvents that can be used in the practice of this invention may contain minor amounts of residual protic compounds from the manufacturing process by which the aprotic solvent is made. "Minor amounts" means typically less than or equal to (≤) 1 wt %, or ≤0.5 wt %, or ≤0.1 wt %, or ≤0.05 wt %, or ≤0.01 wt %, of protic compound in the aprotic solvent based on the combined weight of the aprotic solvent and protic compound.

"Azeotropic" and like terms mean a solvent system of two or more solvents that boil or distill as a single component at a given temperature and pressure while the liquid and the vapor concentrations are the same. "Pseudo-azeotropic" and like terms mean a solvent system that boils or evaporates closely, but not exactly, like a single component, i.e., the solvent system sufficiently approximates an azeotropic system so as to allow it to be used as an azeotropic system.

"Neat" and like terms mean single or undiluted. A solvent containing neat dipropylene glycol dimethyl ether means that dipropylene glycol dimethyl ether is the only component of the solvent.

Di-Isocyanate

The di-isocyanate may be an aromatic, an aliphatic, or a cycloaliphatic di-isocyanate, or a combination of two or more of these compounds. A nonlimiting example of a structural unit derived from a di-isocyanate (OCN—R—NCO) is represented by formula (I) below:

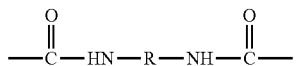

in which R is an alkylene, cyclo-alkylene, or arylene group. Representative examples of these di-isocyanates can be found in U.S. Pat. Nos. 4,012,445; 4,385,133; 4,522,975 and 5,167,899.

Nonlimiting examples of suitable di-isocyanates include 4,4'-di-isocyanato-diphenyl methane, p-phenylene di-isocyanate, 1,3-bis(isocyanatomethyl)-cyclohexane, 1,4-di-isocyanato-cyclohexane, hexamethylene di-isocyanate, 1,5-naphthalene di-isocyanate-3,3'-dimethyl-4,4'-biphenyl di-isocyanate, 4,4'-di-isocyanatodicyclohexyl-methane, 2,4-toluene di-isocyanate, and 4,4'-di-isocyanato-diphenylmethane.

Polyol

The polyols used in the practice of this invention, including both those with and without an acid group, have a molecular weight (number average) in the range from 200 to 10,000 g/mole. Nonlimiting examples of suitable polyols without an acid group include polyether diols (yielding a "polyether PU"); polyester diols (yielding a "polyester PU"); hydroxy-terminated polycarbonates (yielding a "polycarbonate PU"); hydroxy-terminated polybutadienes; hydroxy-terminated polybutadiene-acrylonitrile copolymers; hydroxy-terminated copolymers of dialkyl siloxane and alkylene oxides, such as ethylene oxide, propylene oxide; natural oil diols, and any combination thereof. In one embodiment a single polyol is used. In one embodiment, a combination of two or more polyols are used. In one embodiment one or more of the foregoing polyols may be mixed with an amine-terminated polyether and/or an amino-terminated polybutadiene-acrylonitrile copolymer, depending upon the rate of reaction and the desired polymer structure. Triols and other polyols with more than two hydroxy groups can also be used, e.g., glycerol, trimethylolpropane, and the like. Further examples of polyols useful in the practice of this invention are found in U.S. Pat. No. 4,012,445.

In the present invention, the total hydroxyl group equivalent number of the polyol compound (including the acid group-containing polyol) is preferably 120 to 1,000. When the number of hydroxyl equivalent is within this range, the aqueous resin dispersion containing the obtained polyurethane resin can be easily produced, and a coating film excellent in terms of hardness can be easily obtained. From the viewpoints of the storage stability of the obtained aqueous polyurethane resin dispersion and the hardness, drying property and thickening property of the coating film obtained by coating, the hydroxyl group equivalent number is preferably 150 to 800, or 200 to 700, or 300 to 600.

The number of hydroxyl equivalent can be calculated by the following formulas (1) and (2). Number of hydroxyl equivalent of each polyol is equal to the molecular weight of each polyol divided by the number of hydroxyl groups of each polyol (excluding phenolic hydroxyl group) (1) total hydroxyl group equivalent number of polyol is equal to the total number of moles of M divided by polyol (2). In the case of the polyurethane resin, M in the formula (2) is [[hydroxyl equivalent number of the polyol compound times mol number of the polyol compound] plus [Hydroxyl equivalent number times number of moles of acid group-containing polyol]].

To introduce acid functionality into the prepolymer, at least some portion of the polyol that reacts with the di-isocyanate contains an acid group, e.g., a carboxyl group. The acid group-containing polyol contains two or more hydroxyl groups (excluding phenolic hydroxyl group) and one or more acidic groups in one molecule. Examples of the acidic group include a carboxyl group, a sulfonic acid group, a phosphoric acid group, a phenolic hydroxyl group, and the like. As the polyol containing an acid group, those having two hydroxyl groups and one carboxyl group in one molecule are preferable. The polyol containing an acid group may be used singly or in combination of two or more other polyols containing an acid group.

The polyol containing an acid group is not particularly limited, and examples include, but are not limited to, dimethylolalkanoic acids such as 2,2-dimethylolpropionic acid (DMPA) and 2,2-dimethylolbutanoic acid, N,N-bishydroxyethylglycine, N,N-bishydroxyethylalanine, 3,4-dihydroxybutanesulfonic acid, and 3,6-dihydroxy-2-toluenesulfonic acid. Among these, from the viewpoint of ease of availability, dimethylolalkanoic acid containing 2 methylol groups and having 4 to 12 carbon atoms is preferable. Among dimethylol alkanoic acids, 2,2-dimethylolpropionic acid is preferred.

Chain Extenders

Chain extenders are not necessary to the practice of this invention, but can be used if desired. If used, then these are polyfunctional, typically difunctional, and can be aliphatic straight or branched chain polyols having from 2 to 10 carbon atoms, inclusive, in the chain. Illustrative of such polyols are the diols ethylene glycol, 1,3-propanediol, 1,4-butanediol, 1,5-pentanediol, 1,6-hexanediol, neopentyl glycol, and the like; 1,4-cyclohexanedimethanol; hydroquinonebis-(hydroxyethyl)ether; cyclohexylenediols (1,4-, 1,3-, and 1,2-isomers), isopropylidenebis(cyclohexanols); diethylene glycol, dipropylene glycol, ethanolamine, N-methyldiethanolamine, and the like; and mixtures of any of the above.

The prepolymer can contain, for example, from 2 to 25, preferably from 3 to 20 and more preferably from 4 to 18, weight percent (wt %) of the chain extender component.

Catalyst

The reaction of the di-isocyanate and polyol is promoted through the use of a catalyst. Examples of catalyst include, but are not limited to, a salt of a metal with an organic or inorganic acid, such as a tin-based catalyst (e.g., trimethyltin laurylate, dibutyltin dilaurate and the like), or a lead-based catalyst (e.g., lead octylate, etc.) and organic metal derivatives, amine-type catalysts (e.g., triethylamine, N-ethylmorpholine, triethylenediamine, etc.), and diazobicycloundecene-type catalysts. Tin-based catalysts are preferred.

Solvent System

The solvent system of this invention has a high affinity in terms of solubility for the polyol containing an acid group, e.g., DMPA. The solvent system of this invention is useful for the preparation of PU prepolymers and PUDs.

The solvent systems of this invention consist essentially of, or consist of, a first component and an optional second component. The first component consists essentially of, or consists of, at least one dialkyl amide. A dialkyl amide is an amide that comprises two alkyl groups (R—C(O)—R in which R is an alkyl group). The alkyl groups can be the same or different, and each alkyl group can comprises from 1 to 12, or 1 to 8, or 1 to 6, or 1 to 4, carbon atoms. Dialkyl amides include, but are not limited to, N,N-dimethylpropionamide (N,N-DMPA), N,N-diethylacetamide (DEAC), 3-methoxy-N,N-dimethyl propionamide (M3-N,N-DMPA), N,N-diethylpropionamide (N,N-DEPA) and N-ethyl,N-methylpropionamide. These dialkyl amides exhibit better eco-friendliness with little or no reproductive or carcinogenic toxicity. The solvent systems of this invention can comprise two or more dialkyl amides. If the first component consists essentially of, or consists of, two or more dialkyl amides, then the first component is a blend that may or may not be phase separated.

The optional second component consists essentially of, or consists of, an aprotic glycol ether, e.g., an esterified (preferably acetylated) or etherified compound based on an alkyl ether of ethylene glycol, propylene glycol or other alkyl, e.g., butyl, glycol. Diethers of diethylene glycol, dipropylene glycol and tripropylene glycol also can be used (PROGLYDE™ DMM is a diether of dipropylene glycol). In one embodiment the optional second component consists essentially of, or consists of, two or more aprotic glycol ethers. If the second component consists essentially of, or consists of, two or more aprotic glycol ethers, then the second component is a blend that may or may not be phase separated.

Representative aprotic glycol ethers include, but are not limited to, dipropylene glycol dimethyl ether, propylene glycol methyl ether acetate, propylene glycol diacetate, diethylene glycol n-butyl ether acetate, dipropylene glycol methyl ether acetate, and ethylene glycol butyl ether benzoate. The acetates are not particularly favored because of their limited water solubility and potential hydrolysis once the final PUD is made and as such, they are usually used, if at all, in combination with a water soluble aprotic solvent like PROGLYDE™ DMM or N,N-DMPA. Protic solvents such as ethylene glycol monobutyl ether, ethylene glycol monopropyl ether, diethylene glycol monoethyl ether, propylene glycol methyl ether, dipropylene glycol monomethyl ether and tripropylene glycol monomethyl ether, may be present in the solvent systems of this invention but only as a residue of the manufacturing process from which the aprotic component of in the solvent system is made, and then in only minor amounts, e.g., less than or equal to ($\leq$) 1 wt %, based on the combined weight of the aprotic and protic compounds in the solvent system. The protic solvents are disfavored because they, like water, react fast with the isocyanate.

Commercially available aprotic glycol ethers that can be used in the practice of this invention include, but are not limited to, DOWANOL™ PMA (propylene glycol methyl ether acetate), DOWANOL™ DPMA (dipropylene glycol methyl ether acetate), DOWANOL™ PGDA (propylene glycol diacetate), Butyl CELLOSOLVE™ acetate (ethylene glycol n-butyl ether acetate), Butyl CARBITOL™ acetate (diethylene glycol n-butyl ether acetate), ethylene glycol butyl ether benzoate, and PROGLYDE™ DMM (dipropylene glycol dimethyl ether), all available from The Dow Chemical Company.

The solvent can be a binary blend of two dialkyl amides, or a binary blend of (1) one or more dialkyl amides, e.g., N,N-DMPA, DEAC, M3-N,N-DMPA, and (2) one or more aprotic glycol ethers, e.g., PROGLYDE™ DMM dipropylene glycol dimethyl ether, DOWANOL™ PMA propylene glycol methyl ether acetate, etc. The binary blends of (1) a dialkyl amide, e.g., N,N-DMPA, DEAC, M3-N,N-DMPA, and (2) an aprotic glycol ether, e.g., PROGLYDE™ DMM dipropylene glycol dimethyl ether, DOWANOL™ PMA propylene glycol methyl ether acetate, can also exhibit pseudo-azeotropic or azeotropic character.

In one embodiment the solvent system consists of, or consists essentially of, in weight percent (wt %) based on the weight of the solvent system, from 10 to 100 wt %, or from 20 to 80 wt %, or from 30 to 70 wt %, or from 40 to 60 wt % of the first component, and from 0 to 90 wt %, or from 20 to 80 wt % or from 30 to 70 wt % or from 40 to 60 wt %, of the second component.

In one embodiment the solvent system consists of, or consists essentially of, in weight percent (wt %) based on the weight of the solvent system, from 30 to 100 wt %, or from 40 to 90 wt %, or from 50 to 80 wt %, of at least one of N,N-DMPA, DEAC and M3-N,N-DMPA, and from 0 to 70 wt %, or from 10 to 60 wt %, or from 20 to 50 wt %, of an aprotic glycol ether. In one embodiment the aprotic glycol ether is dipropylene glycol dimethyl ether.

In those embodiments in which the first and/or second component consists of more than one substance, e.g., the first component consists essentially of two or more dialkyl amides, and/or the second component consists essentially of two or more aprotic glycol ethers, the amount of each substance in a particular component can vary widely and to convenience. The amount of each individual substance in the component can vary from 0 to 100 wt %, or from 1 to 99 wt %, or from 10 to 90 wt %, or from 20 to 80 wt % or from 30 to 70 wt %, or from 40 to 60 wt %, or 50 wt %, based on the weight of the component.

Optional materials that are not essential to the operability of, but can be included in, the solvent systems of this invention include, but are not limited to, antioxidants, colorants, water scavengers, stabilizers, fillers, diluents (e.g., aromatic hydrocarbons), and the like. These materials do not have any material impact on the efficacy of the solvent system for providing a reaction medium for the preparation of a prepolymer. These optional materials are used in known amounts, e.g., 0.10 to 5, or 4, or 3, or 2, or 1, weight percent based on the weight of the solvent system, and they are used in known ways.

Preparation of the Solvent Systems

Solvent systems of this invention consisting essentially of, or consisting of, two or more compounds, e.g., a dialkyl amide and an aprotic glycol ether, are made using known equipment and known techniques. The individual components of the solvent system are commercially available, liquid at ambient conditions (23° C. and atmospheric pressure), and can simply be mixed with one another using conventional mixing equipment and standard blending protocols. The components can be added to one another in any order including simultaneously.

Use of the Solvent Systems

The solvent systems of this invention are eco-solvents, i.e., they do not have, or have at a reduced level, the toxicology issues associated with NMP. These solvent systems are used in the same manner as mediums for the preparation of a prepolymer as NMP and other polar solvents.

The dialkyl amides, e.g., N,N-DMPA, will dissolve a polyol containing acid group, e.g., DMPA, (at 25° C.) at weight ratios of 1:3 to 1:9 polyol containing acid group to dialkyl amide. These ranges translate into solutions containing 10-25% of a polyol containing acid group. Blends of N,N-DMPA and dipropylene glycol dimethyl ether containing 33 to 66% by weight of the ether will dissolve DMPA to various degrees. Pseudo-azeotropic blends containing 35 to 83% by weight dipropylene glycol dimethyl ether will dissolve DMPA to various degrees. Preferred blends of one or more dialkyl amides and one or more aprotic glycol ethers contain up to 66% by weight aprotic glycol ether, and more preferred blends contain 25-50% by weight aprotic glycol ether.

Polyurethane Dispersion

The process for producing an aqueous polyurethane dispersion (PUD) is a three-step process comprising: (1) preparing the prepolymer as described above, (2) neutralizing the acid functionality of the prepolymer, and (3) dispersing the prepolymer in water. Virtually any base can be used as the neutralizing agent. Examples include, without limitation, trimethylamine, triethylamine, tri-isopropylamine, tributylamine, triethanolamine, N-methyldiethanolamine, N-ethyldiethanolamine, N-phenyldiethanolamine, dimethylethanolamine, diethylethanolamine, N-methylmorpholine, organic amines such as pyridine, inorganic alkali salts such as sodium hydroxide and potassium hydroxide, and ammonia. For the neutralization of carboxyl groups, organic amines are preferred, and tertiary amines more preferred, especially triethylamine.

In the step of dispersing the polyurethane prepolymer in an aqueous medium can be performed using conventional equipment and techniques. For example, the prepolymer can be added to a blender of stirred water and mixed until a substantially homogeneous blend is obtained. Alternatively, water can be added to a blender of stirred prepolymer. The mixing is typically conducted at ambient conditions (23° C. and atmospheric pressure). Various additives, e.g., stabilizers, antioxidants, surfactants, etc., can be added to the dispersion in known amounts and using known methods. The amount of prepolymer in the dispersion can vary widely, but typically the prepolymer comprises 5 to 60, or 15 to 50, percent of the dispersion by mass.

The following examples are nonlimiting illustrations of the invention.

EXAMPLES

The following solvent systems are initially screened by Hansen solubility parameters and compared with NMP, and then selected for a series of solubility experiments. Blends of N,N-DMPA, N,N-DEAC, and M3-N,N-DMPA with PROGLYDE™ DMM dipropylene glycol dimethyl ether exhibit better compatibility in terms of solubility with DMPA than PROGLYDE™ DMM dipropylene glycol dimethyl ether itself. Furthermore, the blends of the dialkyl amides and PROGLYDE™ DMM dipropylene glycol dimethyl ether exhibit pseudo-azeotropic and/or azeotropic character which makes them behave as a single solvent during evaporation and easier to recover by distillation for potential recycle.

Example 1

At room temperature (23° C.), 1 gram (g) of DMPA and 9 g solvent are added into a glass bottle and mixed on a shaker for 30 minutes. After shaking, the appearance of the mixture in each bottle is observed for solubility. The solvent is either neat dialkyl amide or a blend of dialkyl amide with PROGLYDE™ DMM dipropylene glycol dimethyl ether. Blends are prepared in three blend ratios: 2:1, 1:1, and 1:2 ether:dialkyl amide.

Example 2

At room temperature (23° C.), 1 g DMPA and various weights of solvent are added into a glass bottle, then mixed for 30 minutes before checking the appearance.

Example 3

The vapor pressures versus temperature profiles of neat PROGLYDE™ DMM dipropylene glycol dimethyl ether, neat N,N-DMPA, and of three different blends of dipropylene glycol dimethyl ether and N,N-DMPA containing 83 wt %, 55 wt %, and 35 wt % dipropylene glycol dimethyl ether respectively are measured in an ebulliometer in the 5-760 millimeters of mercury (mmHg) pressure range by ASTM E1719 to obtain Antoine constants and the normal boiling points of pure components and blends. Pseudo-azeotropes and actual minimum boiling azeotropes are indicated by a normal boiling point which is lower than the boiling point of either of the neat components. The solubility of DMPA in these blends is also evaluated at 25° C. at the DMPA:solvent blend ratio of 1:9. The composition of the blends is detailed in Table 1 below:

TABLE 1

Blends Evaluated in Ebulliometer

| Sample | Mass (g) | | Wt. Frac. | | Mol. Frac. | |
|---|---|---|---|---|---|---|
| | DMM | DMPA | DMM | DMPA | DMM | DMPA |
| Blend 1 | 71.366 | 59.015 | 0.547365 | 0.452635 | 0.429867 | 0.570133 |
| Blend 2 | 45.779 | 85.490 | 0.348742 | 0.651258 | 0.250303 | 0.749697 |
| Blend 3 | 107.667 | 22.431 | 0.827584 | 0.172416 | 0.749543 | 0.250457 |

Results

Figure 2:
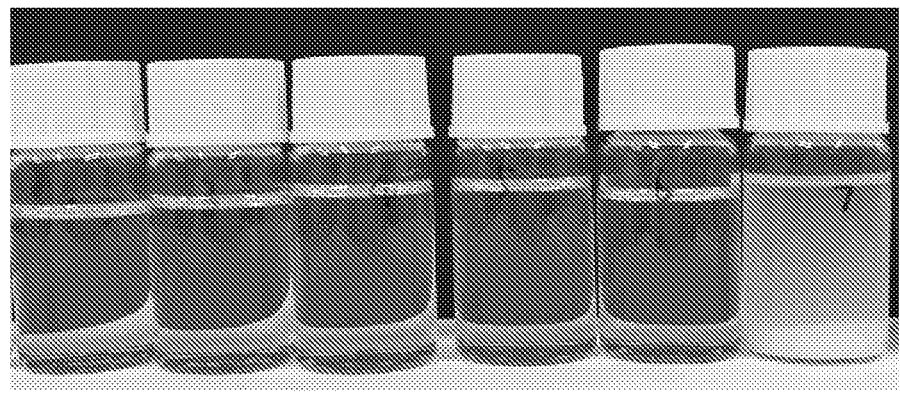
FIG. 2 is an image of sample jars showing the solubility of DMPA in various solvents.

FIG. 2 shows the affinity in terms of solubility of different solvents toward DMPA at the weight ratio of solvent:DMPA of 9:1. The results indicate that the three dialkyl amides, N,N-DMPA, N,N-DEAC and M3-N,N-DMPA, have good affinity toward DMPA and much better affinity than neat dipropylene glycol dimethyl ether.

Figure 3:
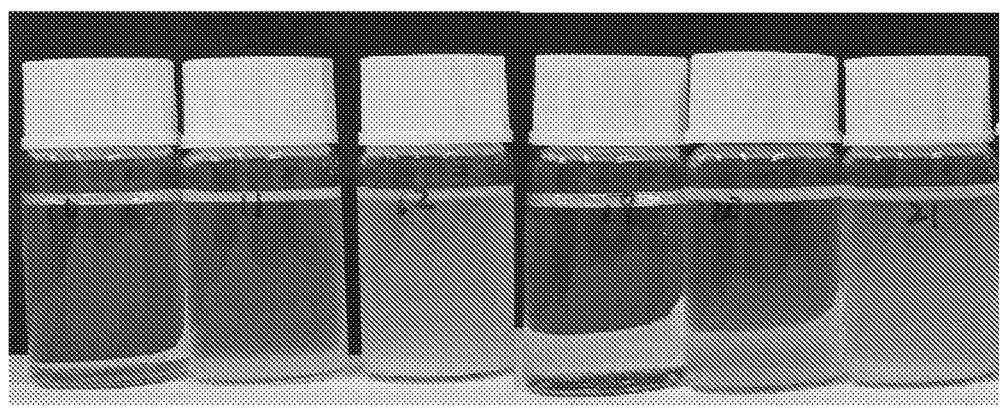
FIG. 3 is an image of sample jars showing the solubility of DMPA in various solvent blends at a weight ratio of solvent to DMPA of 9:1.

FIG. 3 shows the solubility of DMPA in solvent blends at the weight ratio of solvent:DMPA at 9:1. N,N-DMPA and N,N-DEAC are mixed with PROGLYDE™ DMM dipropylene glycol dimethyl ether at the ratios 2:1, 1:1 and 1:2, respectively. The results show that the dialkyl amides:ether blends have better affinity for DMPA than the neat ether, and that the best solubility for DMPA is achieved at the higher dialkyl amide:ether ratio of 2:1.

Figure 4:
FIG. 4 is an image of sample jars showing the solubility of DMPA in N,N-DMPA.

FIG. 4 shows the solubility of DMPA in N,N-DMPA at different weight ratios. The results indicate that N,N-DMPA can dissolve DMPA effectively, and that the solubility increases as the ratio of dialkyl amide to DMPA increases from 3:1 to 8:1.

The vapor pressure data collected from the ebulliometer for the three blends described in Experiment 3 is shown in Table 2. The normal boiling points of PROGLYDE™ DMM dipropylene glycol dimethyl ether and N,N-DMPA are measured as 174.931° C. and 175.186° C. respectively. The boiling points of Blend 1 (55 wt % ether), Blend 2 (35 wt % ether), and Blend 3 (83 wt % ether) are measured as 172.753° C., 172.859° C. and 172.735° C. respectively.

TABLE 2

Vapor Pressure/Temperature Profiles for DMM/N,N-DMPA Blends

| P (mmHg) | T (° C.) | | |
|---|---|---|---|
| | Blend 1 | Blend 2 | Blend 3 |
| 5 | 48.155 | 47.796 | 48.475 |
| 10 | 59.776 | 59.447 | 60.058 |
| 25 | 77.330 | 77.014 | 77.551 |
| 50 | 92.422 | 92.132 | 92.531 |
| 100 | 109.263 | 109.020 | 109.202 |
| 200 | 128.257 | 128.089 | 128.047 |
| 300 | 140.541 | 140.449 | 140.350 |
| 400 | 149.860 | 149.825 | 149.779 |
| 500 | 157.471 | 157.493 | 157.431 |
| 600 | 163.960 | 164.017 | 163.930 |
| 700 | 169.646 | 169.735 | 169.624 |
| 760 | 172.753 | 172.859 | 172.735 |

Figure 5:
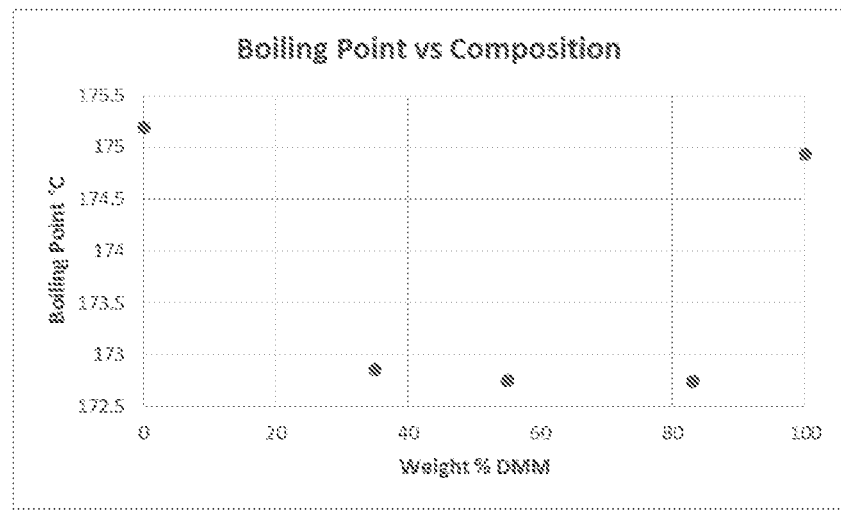
FIG. 5 is a plot of the normal boiling points of neat N,N-dimethylpropanamide (N,N-DMPA) and dipropylene glycol dimethyl ether, and the boiling points of various blends of N,N-DMPA and dipropylene glycol dimethyl ether.

The normal boiling points of the pure components and the blends are plotted in FIG. 5. It can be seen that the three blends exhibit pseudo-azeotropic character as shown by their lower boiling point. A true azeotrope is likely to exist in the range of compositions defined by these blends.

Figure 6:
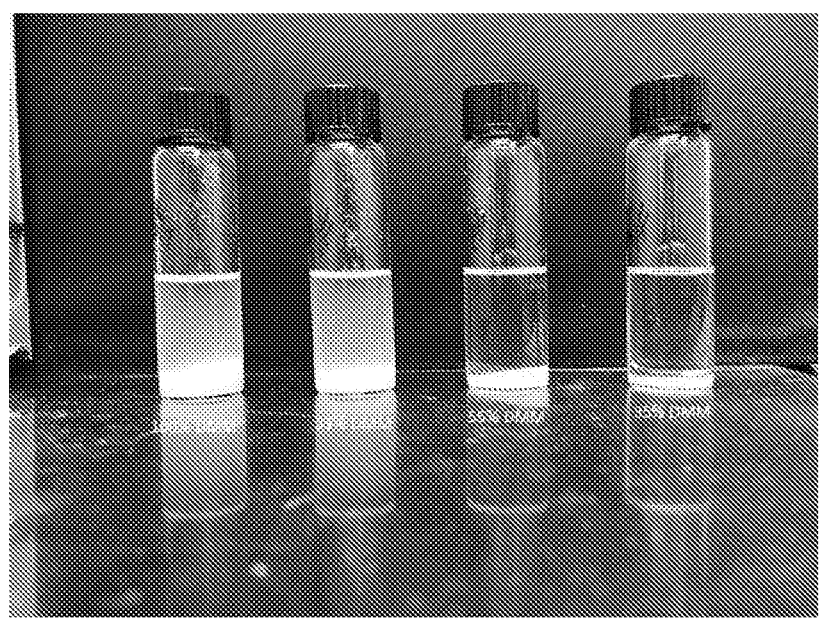
FIG. 6 is an image of sample jars showing the solubility of DMPA in various solvent blends of N,N-DMPA and dipropylene glycol dimethyl ether at a weight ratio of DMPA to solvent of 1:9.

The solubility of DMPA in the blends is evaluated at the 1:9 DMPA to Blend ratio. As shown in FIG. 6, the blends dissolved more DMPA than the neat dipropylene glycol dimethyl ether, and the solubility increased as the ether concentration in the blend decreased.

The invention claimed is:

1. A process for making a prepolymer comprising an acid group, the process comprising the step of contacting
    (i) a di-isocyanate,
    (ii) a polyol containing an acid group,
    (iii) a polyol without an acid group, and
    (iv) a metal salt catalyst,
the contacting conducted under reaction conditions and in a solvent consisting of:
    (A) a first component consisting of at least one dialkyl amide of N,N-dimethylpropionamide (N,N-DMPA), and 3-methoxy-N,N-dimethyl propionamide (M3-N,N-DMPA), and
    (B) optionally, a second component consisting of at least one of an aprotic glycol ether.

2. A three-step process for making a water-based polyurethane dispersion (PUD), the process comprising the steps of:
    (1) forming a prepolymer with acid group by contacting:
        (i) a di-isocyanate,
        (ii) a polyol containing an acid group,
        (iii) a polyol without an acid group, and
        (iv) a metal salt catalyst,
    the contacting conducted under reaction conditions and in a solvent consisting essentially of:
        (A) a first component consisting of at least one dialkyl amide, and
        (B) a second component consisting of at least one of an aprotic glycol ether of propylene glycol methyl ether acetate, dipropylene glycol methyl ether acetate, propylene glycol diacetate, ethylene glycol n-butyl ether acetate, diethylene glycol n-butyl ether acetate, and dipropylene glycol dimethyl ether;
    (2) neutralizing the acid group of the prepolymer and any residual di-isocyanate with a base; and
    (3) dispersing the neutralized prepolymer in water.

3. The process of claim 1 in which the acid group is a carboxyl group.

4. The process of claim 1 in which the polyol containing an acid group is 2,2-dimethylolpropionic acid.

5. The process of claim 1 in which the metal salt catalyst is an organic tin salt catalyst.

6. A process for making a prepolymer comprising an acid group, the process comprising
    contacting
        (i) a di-isocyanate,
        (ii) a polyol containing an acid group,
        (iii) a polyol without an acid group, and
        (iv) a metal salt catalyst,
    the contacting conducted under reaction conditions and in a solvent consisting essentially of
        (A) a first component consisting of at least one dialkyl amide, and
        (B) a second component consisting of at least one of an aprotic glycol ether, propylene glycol methyl ether acetate, dipropylene glycol methyl ether acetate, propylene glycol diacetate, ethylene glycol n-butyl ether acetate, diethylene glycol n-butyl ether acetate, and dipropylene glycol dimethyl ether.

7. The process of claim 1 wherein the first component is N,N-DMPA.

8. The process of claim 1 wherein the first component is M3-N,N-DMPA.

9. The process of claim 1 in which the optional second component is present and is at least one of propylene glycol methyl ether acetate, dipropylene glycol methyl ether acetate, propylene glycol diacetate, ethylene glycol n-butyl ether acetate, diethylene glycol n-butyl ether acetate, and dipropylene glycol dimethyl ether.

* * * * *